（12) United States Patent
Hou (10) Patent No.: US 11,030,733 B2
(45) Date of Patent: Jun. 8, 2021

(54) METHOD, ELECTRONIC DEVICE AND STORAGE MEDIUM FOR PROCESSING IMAGE

(71) Applicant: Beijing Dajia Internet Information Technology Co., Ltd., Beijing (CN)

(72) Inventor: Peihong Hou, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/098,066

(22) Filed: Nov. 13, 2020

(65) Prior Publication Data

US 2021/0065342 A1     Mar. 4, 2021

Related U.S. Application Data

(63) Continuation of application No. PCT/CN2019/114886, filed on Oct. 31, 2019.

(30) Foreign Application Priority Data

Dec. 24, 2018  (CN) .......................... 201811585135.3

(51) Int. Cl.
*G06K 9/00*     (2006.01)
*G06T 5/50*     (2006.01)
(Continued)

(52) U.S. Cl.
CPC ............ *G06T 5/50* (2013.01); *G06K 9/00228* (2013.01); *G06K 9/00281* (2013.01);
(Continued)

(58) Field of Classification Search
None
See application file for complete search history.

(56) References Cited

U.S. PATENT DOCUMENTS 8,635,545 B2 *  1/2014  Kim ...................... G06F 3/0488
                                                              715/764
8,913,077 B2 * 12/2014  Li ......................... H04N 13/398
                                                              345/596
(Continued)

FOREIGN PATENT DOCUMENTS

CN          104063890        9/2014
CN          105187736        12/2015
(Continued)

OTHER PUBLICATIONS

International Searching Authority, "Search Report," issued in connection with International Patent Application No. PCT/CN2019/114886, dated Jan. 6, 2020, 4 pages.
(Continued)

*Primary Examiner* — Hadi Akhavannik
(74) *Attorney, Agent, or Firm* — Hanley, Flight & Zimmerman, LLC (57) ABSTRACT

A method electronic device and storage medium for processing an image are provided. The method includes: receiving an instruction for a preset fly-away special effect; creating a facial grid and facial feature grids in the image to be processed; determining a facial image in an image region covered by the facial grid; setting a pixel value of each pixel in the facial image to a target pixel value; extracting facial feature images from an image region covered by the facial feature grids; and obtaining a target image by mapping the facial feature images onto the facial image based on a preset triangular mapping algorithm and a preset offset.

20 Claims, 8 Drawing Sheets

(51) Int. Cl.
   *H04N 5/262* (2006.01)
   *H04N 5/265* (2006.01)
   *H04N 5/232* (2006.01)

(52) U.S. Cl.
   CPC .......... *H04N 5/265* (2013.01); *H04N 5/2628* (2013.01); *G06T 2200/24* (2013.01); *G06T 2207/20221* (2013.01); *G06T 2207/30201* (2013.01); *H04N 5/23229* (2013.01)

(56) References Cited

U.S. PATENT DOCUMENTS

| | | | | |
|---|---|---|---|---|
| 2002/0145660 | A1* | 10/2002 | Kanade | H04N 5/232 348/36 |
| 2005/0192085 | A1* | 9/2005 | Iwamoto | G07F 17/3227 463/20 |
| 2007/0126741 | A1* | 6/2007 | Gerhard | G11B 27/034 345/473 |
| 2010/0321475 | A1* | 12/2010 | Cox | H04N 5/232 348/47 |
| 2015/0135124 | A1* | 5/2015 | Wang | G06F 3/0482 715/778 |
| 2015/0294491 | A1* | 10/2015 | Nungester | H04N 9/3141 345/173 |

FOREIGN PATENT DOCUMENTS

| | | |
|---|---|---|
| CN | 106415665 | 2/2017 |
| CN | 106919906 | 7/2017 |
| CN | 107431635 | 12/2017 |
| CN | 109672830 | 4/2019 |
| EP | 2615386 | 5/2014 |
| JP | 2016179033 | 10/2016 |
| WO | 2015139231 | 9/2015 |

OTHER PUBLICATIONS

China National Intellectual Property Administration, "First Office Action," issued in connection with Chinese Patent Application No. 201811585135.3, dated Nov. 27, 2019, 10 pages (English Translation Included).

China National Intellectual Property Administration, "Second Office Action," issued in connection with Chinese Patent Application No. 201811585135.3, dated Apr. 7, 2020, 7 pages (English translation Included).

Chinat National Intellectual Property Administration, "Notification to Grant Patent Right for Invention," dated Aug. 4, 2020, issued in connection with Chines Patent Application No. 201811585135.3, 3 pages (English Translation Included).

* cited by examiner

METHOD, ELECTRONIC DEVICE AND STORAGE MEDIUM FOR PROCESSING IMAGE

CROSS-REFERENCE OF RELATED APPLICATIONS

This application is the continuation application of International Application No. PCT/CN2019/114886, filed on Oct. 31, 2019, which is based on and claims priority under 35 U.S.C. 119 to Chinese Patent Application No. 201811585135.3, filed on Dec. 24, 2018 in the China National Intellectual Property Administration and entitled "Method, apparatus, electronic device and storage medium for processing image", the disclosure of which is herein incorporated by reference in its entirety.

FIELD

The present disclosure relates to the field of computer technology, and in particular to a method, apparatus, electronic device and storage medium for processing an image.

BACKGROUND

With the development of computer graphics technology, electronic devices can process images in photos or videos taken by users, to achieve the effect of adding special effects.

However, the inventor found that electronic devices can only add special effects by adding the reference mask to the user's face, the special effect is simplex, and the user experience is poor.

BRIEF SUMMARY

According to embodiments of the disclosure, a method for processing an image is provided, which includes:

receiving an instruction for a preset fly-away special effect;

creating a facial grid and facial feature grids in the image to be processed;

determining a facial image in an image region covered by the facial grid;

setting a pixel value of each pixel in the facial image to a target pixel value;

extracting facial feature images from an image region covered by the facial feature grids; and obtaining a target image by mapping the facial feature images onto the facial image based on a preset triangular mapping algorithm and a preset offset.

According to embodiments of the disclosure, an apparatus for processing an image is provided, which includes:

a creating unit configured to create a facial grid and facial feature grids in the image to be processed when receiving an instruction for a preset fly-away special effect;

a first determining unit configured to determine a facial image in an image region covered by the facial grid;

a setting unit configured to set a pixel value of each pixel in the facial image to a target pixel value;

an extracting unit configured to extract facial feature images from an image region covered by the facial feature grids; and a mapping unit configured to obtain a target image by mapping the facial feature images onto the facial image based on a preset triangular mapping algorithm and a preset offset.

According to embodiments of the disclosure, an electronic device is provided, which includes:

a memory storing a computer program as well as candidate intermediate data and result data generated when the computer program is executed;

a processor configured to:

create a facial grid and facial feature grids in an image to be processed when receiving an instruction for a preset fly-away special effect;

determine a facial image in an image region covered by the facial grid;

set a pixel value of each pixel in the facial image to a target pixel value;

extract facial feature images from an image region covered by the facial feature grids; and obtain a target image by mapping the facial feature images onto the facial image based on a preset triangular mapping algorithm and a preset offset.

According to embodiments of the disclosure, a computer readable storage medium is provided, which carries one or more computer instruction programs thereon. When the computer instruction programs are executed by one or more processors, the one or more processors implement the steps of any method described in embodiments of the present disclosure.

According to embodiments of the disclosure, a computer program product containing instructions is provided, which causes a computer to perform any image processing method described above when running on the computer.

DETAILED DESCRIPTION OF THE EMBODIMENTS

Figure 1:
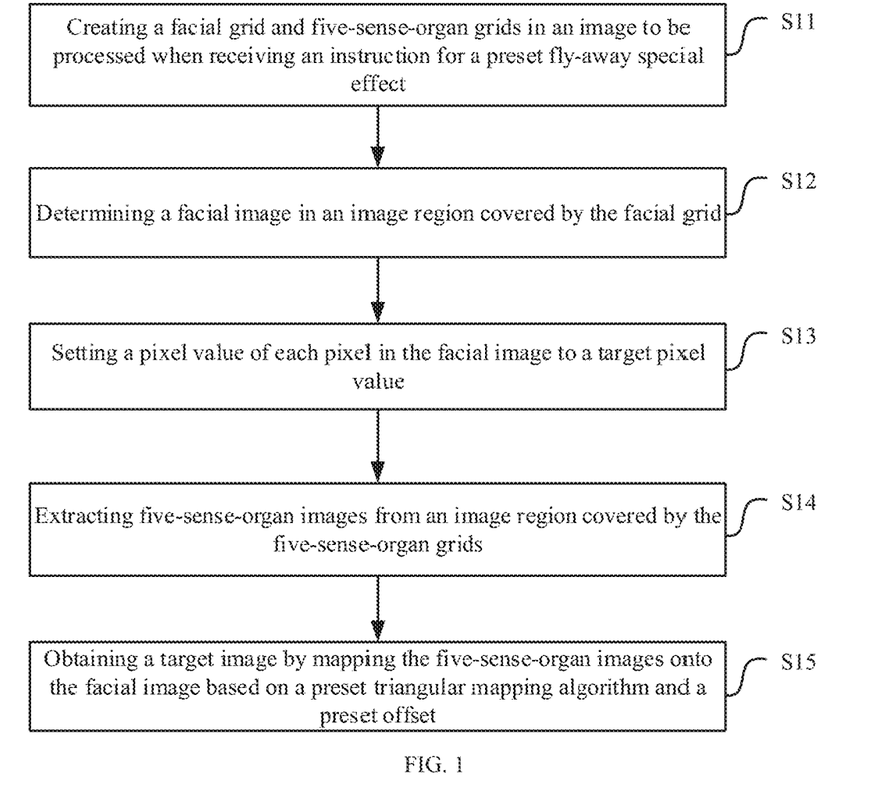
FIG. 1 is a flow chart of a method for processing an image according to an embodiment of the disclosure.

FIG. 1 is a flow chart of a method for processing an image according to an embodiment of the disclosure. The method is used in a terminal. The terminal may be an electronic device (e.g., a mobile phone) with the shooting function. As shown in FIG. 1, the processing flow includes the following steps.

The step S11 is of creating a facial grid and facial feature grids in the image to be processed when receiving an instruction for a preset fly-away special effect.

In some embodiments, multiple special effect icons can be displayed in the preset display interface of the terminal. When using the terminal to shoot a video or photo, the user can select a special effect icon from the multiple special effect icons displayed on the terminal to add the corresponding special effect to the video or photo. When the user clicks the preset fly-away special effect icon, the terminal receives the instruction for a fly-away special effect.

When the user takes a photo, the terminal can recognize whether the photo includes a face based on a preset face recognition algorithm. If the recognition result is yes, the photo is taken as the image to be processed; and if the recognition result is no, no action will be taken. Then the terminal can create the facial grid and facial feature grids in the image to be processed.

When the user shoots a video, the terminal can, for each frame of image in the video, recognize whether the frame of image includes a face based on a preset face recognition algorithm. If the recognition result is yes, the frame of image is taken as the image to be processed; and if the recognition result is no, a next frame of image is recognized.

Figure 2A:
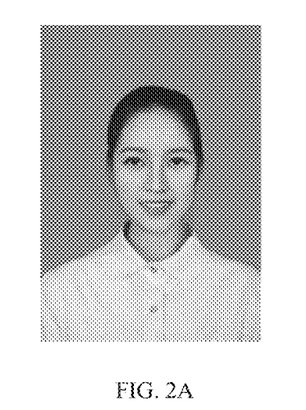
FIG. 2A is a schematic diagram of an image to be processed according to an embodiment of the disclosure.

The terminal can create the facial grid and facial feature grids in the image to be processed. The five facial features include eyes, mouth, and nose. As shown in FIG. 2A, it is a schematic diagram of an image to be processed provided by an embodiment of the present disclosure. As shown in FIGS. 2B to 2F, they are schematic diagrams of the facial grid, the facial feature grid of left eye, the facial feature grid of right eye, the facial feature grid of nose, and the facial feature grid of mouth created by the terminal respectively.

The specific process for the terminal to create the facial grid and facial feature grids will be described in detail later.

The step S12 is of determining a facial image in an image region covered by the facial grids.

In some embodiments, a facial area mask may be pre-stored in the terminal, and the facial area mask is a face mask without facial feature images.

The terminal may take the image to be processed as a first image layer. After determining the facial grid, the terminal may determine the image region covered by the facial grid from the image to be processed. Then, the terminal may acquire the pre-stored facial area mask, and map the facial area mask to the image region covered by the facial grid based on a preset mapping algorithm, to obtain the facial image. The terminal may take the image to be processed containing the facial image as a second image layer.

The step S13 is of setting a pixel value of each pixel in the facial image to a target pixel value.

In some embodiments, the target pixel value may be pre-stored in the terminal, or the terminal may determine the target pixel value based on the image to be processed.

The terminal may set the pixel values of multiple pixels contained in the facial image to the target pixel value, so that the user's face in the second image layer has the smoothing effect, and the skin color of the user's face is more uniform. As shown in FIG. 2G, an embodiment of the present disclosure provides an example view of a facial image.

In some embodiments, the terminal determines the target pixel value based on the image to be processed and sets the pixel values of pixels in the facial area as the target pixel value, by the following steps.

Step 1 is of extracting pixel values of pixels at a plurality of preset positions in the image to be processed.

The preset positions include positions at the forehead and/or cheek of the user. Alternatively, the preset positions may also be other positions of the user's facial image, e.g., a position at the temple.

In some embodiments, the terminal may recognize the preset positions from the image to be processed based on a preset face recognition algorithm, and for each preset position, extract pixel value(s) of one or more pixels at the preset position.

For example, the terminal can recognize the preset positions such as positions at the user's forehead, temple and cheek based on the preset face recognition algorithm. Then the terminal can extract the pixel value of one pixel at each of the preset positions such as positions at the forehead, temple and cheek. When the terminal stores the pixel values of pixels based on the Red-Green-Blue (RGB) color pattern, the pixel values at the preset positions may be (252, 224, 203, 255).

Step 2 is of calculating the average value of the pixel values, and taking the average value as the target pixel value.

In some embodiments, the terminal may calculate the average value of the pixel values extracted at the preset positions, and then take the average value as the target pixel value.

In some embodiments of the present disclosure, the terminal sets pixel values of respective pixels in the facial area to the target pixel value, so that the facial image from which the facial feature images are removed is filled with a flesh color, and the facial image has the smooth visual effect.

In some other embodiments, a variety of skin texture samples may be pre-stored in the terminal, where different skin texture samples are used to represent different skin textures. The staff can preset a certain skin texture sample as the target skin texture sample. The terminal can select the target skin texture sample after setting the target pixel value for the facial image, and set the facial image to have the skin texture corresponding to the skin texture sample, so that the visual effect of the user's facial image in the second image layer is closer to the user's actual face.

In some embodiments of the present disclosure, the specific process in which the terminal sets the facial area to have the skin texture corresponding to the skin texture sample is the prior art, and will not be repeated here.

The step S14 is of extracting facial feature images from an image region covered by the facial feature grids.

In some embodiments, the terminal may determine, for multiple facial feature grids in the image to be processed, the image regions contained in the respective facial feature grids, and extract the facial feature images from the image regions. The image containing the facial feature images is taken as a third image layer.

The step S15 is of mapping the facial feature images onto the facial image based on a preset triangular mapping algorithm and a preset offset.

In some embodiments, a plurality of offsets may be pre-stored in the terminal. The offsets include the offset direction and offset size of a certain facial feature image relative to the position of this facial feature image in the image to be processed. Depending on different shooting modes in which the image to be processed is shot, the offsets are also different. When the image to be processed is a photo, the terminal may obtain the pre-stored first offset as the offset of the image to be processed. The terminal may pre-store the correspondence between offset and time. When the image to be processed is a certain frame of image in a video, the terminal may determine the second offset as the offset of the image to be processed according to the time of receiving the instruction for a fly-away special effect and the correspondence between offset and time.

After determining the offset of each facial feature image, the terminal can map the facial feature images onto the facial image according to the preset triangle mapping algorithm and offsets to obtain the processed target image.

For example, the plurality of offsets stored in the terminal are the left-eye offset by 1-5 cm in any direction, the right-eye offset by 1-5 cm in any direction, the nose offset by 1-7 cm in any direction, and the mouth offset by 1-7 cm in any direction. The any direction may be any direction centered on a certain facial feature.

When the image to be processed is a photo, the terminal can obtain the pre-stored first offsets. The first offsets are the left-eye offset to the right by 1 cm, the right-eye offset to the left by 1 cm, the nose upward offset by 1 cm, and the mouth upward offset by 1 cm. The terminal can map the facial feature images onto the facial image based on the preset triangle mapping algorithm and the first offsets. In the resulting target image, the left eye of the user is offset to the right by 1 cm, the right eye is offset to the left by 1 cm, the nose is offset upwards by 1 cm, and the mouth is offset upwards by 1 cm, so that the user's five facial features have the fly-away effect.

When the image to be processed is a certain frame of image in a video, the terminal can firstly determine that the time of receiving the instruction for a fly-away special effect is 1s. Then, the terminal can determine that the second offsets corresponding 1s are the left-eye offset to the left by 1 cm, the right-eye offset to the right by 1 cm, the nose upward offset by 1 cm, and the mouth downward offset by 1 cm based on the pre-stored correspondence between offset and time.

The terminal can map the facial feature images onto the facial image based on the preset triangle mapping algorithm and the second offsets. In the resulting target image, the left eye of the user is offset to the left by 1 cm, the right eye is offset to the right by 1 cm, the nose is offset upwards by cm, and the mouth is offset downwards by 1 cm. As shown in FIG. 2H, an embodiment of the present application provides an example view of the target image obtained after the terminal adds the fly-away special effect to the user's face.

In some embodiments of the present application, the offsets corresponding to different times are also different. The terminal determines different offset directions and offset sizes according to different times for the image to be processed in the preset processing period, so that the user's face has the effect of the five facial features flying away and back, improving the user experience. The terminal may also periodically perform the above steps based on the processing cycle in the process during which the user shoots a video, so that the five facial features of the user's face have the effect of periodically flying away and back, further improving the user experience.

In some embodiments of the present application, when receiving the instruction for a fly-away special effect, the terminal creates the facial grid and facial feature grids in the image to be processed, determines a facial image based on the facial grid, determines facial feature images based on the facial feature grids, and then maps the facial feature images onto the facial image based on the preset triangular mapping algorithm and the preset offset, to obtain a target image. The terminal changes the position(s) of the facial feature image (s) relative to the facial image according to the preset offset(s), so that the five facial features of the user have the fly-away effect.

Compared with the scenario where the terminal performs the mapping and matching of a mask based on only three feature points (two eyes and mouth) of a user when mapping the mask to the user's facial area in the prior art, the terminal in the present application creates the facial grid and facial feature grids of the user based on multiple key points, and maps the facial feature images onto the facial image based on the triangular mapping algorithm and multiple key points that make up the facial grid and facial feature grids, which can ensure that the facial feature images mapped to the facial image be more naturally compared with the real five facial features of the user.

In addition, the terminal maps the facial feature images to the facial image based on the triangular mapping algorithm, which is equivalent to mapping the third image layer to the second image layer. The target image consists of the first image layer (i.e., the image to be processed), the second image layer and the third image layer. In some other embodiments, the terminal can realize many kinds of display effects by setting the display transparency of the second and third image layers, improving the user experience.

In some embodiments, the processing flow for the terminal to create the facial grid and facial feature grids based on the image to be processed is as follows.

Step 1 is of mapping a first number of key points in a pre-stored first face template onto a facial image region of a user in the image to be processed based on a preset mapping algorithm.

In some embodiments, the first face template may be pre-stored in the terminal. As shown in FIG. 2I, it is a schematic diagram of a first face template provided by an embodiment of the present application. The first number of key points are stored in the first face template, and the first number of key points are evenly distributed in the face, five facial features, and image regions within a preset range around the face in the first face template. Each key point belongs to one of multiple preset types of key points. The preset types of key points include facial type, mouth type, nose type, and eye type. The type of a key point is used to represent the type of the grid constructed by the key point, that is, the key point is used to construct a facial grid or facial feature grid.

In some embodiments, the first number may be 200.

After acquiring the image to be processed, the terminal can map the first number of key points in the pre-stored first face template onto the facial image region of the user in the image to be processed based on the preset mapping algorithm, to obtain the corresponding first number of key points on the facial image region of the user. Correspondingly, the type of each key point is not changed.

In some embodiments of the present application, the mapping algorithm may be any algorithm with mapping function.

Step 2 is of creating the facial grid and facial feature grids based on the first number of key points and the preset types of key points.

In some embodiments, the terminal can classify the first number of key points according to the preset types of key points to obtain multiple key points corresponding to different types, and then create grids respectively based on multiple key points corresponding to each type to obtain the facial grid and facial feature grids.

In some embodiments, the terminal can number each key point. When the first number is 200, the numeral numbers of the key points are 1 to 200. The terminal can store the correspondence between numeral numbers of key points and grids, where the correspondence between grids and numeral numbers is, for example, as follows: the eye grid is composed of key points with numeral numbers of 67-80. When creating a certain grid, the terminal can determine the numeral numbers of multiple key points corresponding to this grid according to the correspondence between numeral numbers and grids, and create the grid based on the key points with the determined numeral numbers, thus obtaining the facial grid and facial feature grids.

Figure 2B:
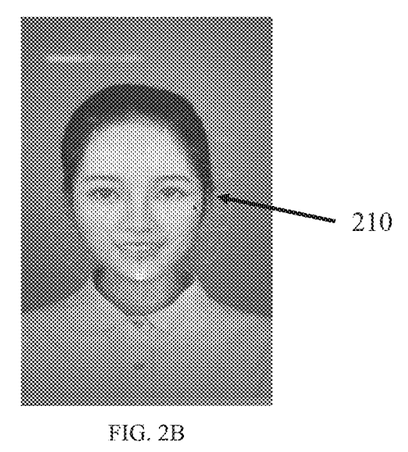
FIG. 2B is a schematic diagram of a facial grid according to an embodiment of the disclosure.
Figure 2C:
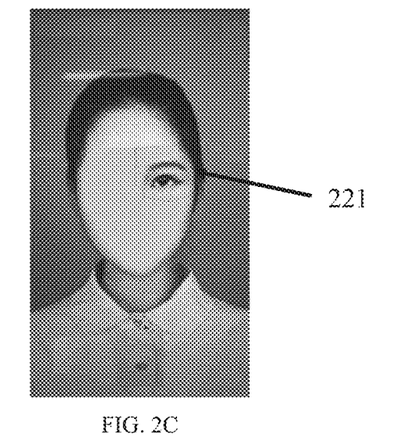
FIG. 2C is a schematic diagram of a facial feature grid of the left eye according to an embodiment of the disclosure.
Figure 2D:
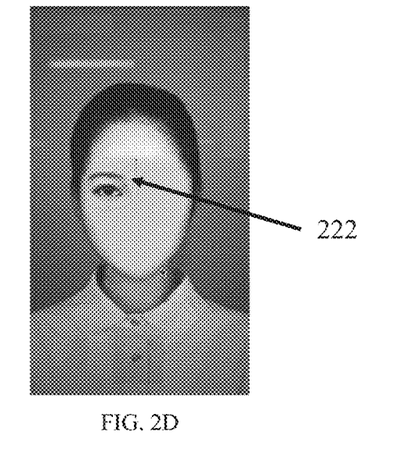
FIG. 2D is a schematic diagram of a facial feature grid of the right eye according to an embodiment of the disclosure.
Figure 2E:
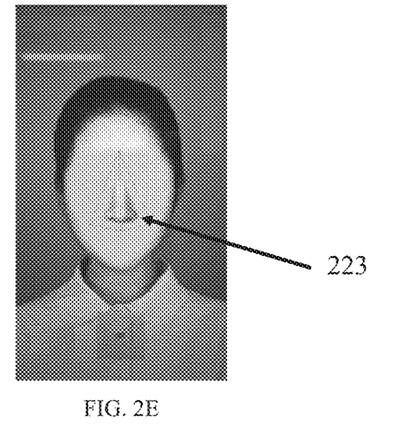
FIG. 2E is a schematic diagram of a facial feature grid of the nose according to an embodiment of the disclosure.
Figure 2F:
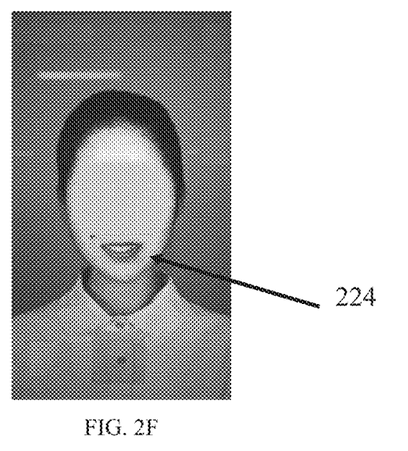
FIG. 2F is a schematic diagram of a facial feature grid of the mouth according to an embodiment of the disclosure.
Figure 2G:
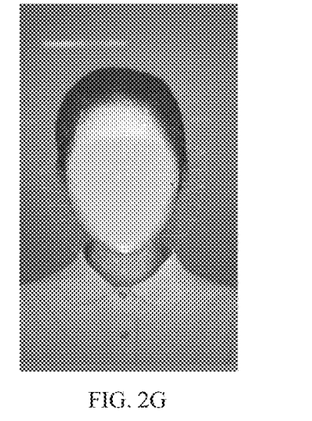
FIG. 2G is a schematic diagram of a facial image according to an embodiment of the disclosure.
Figure 2H:
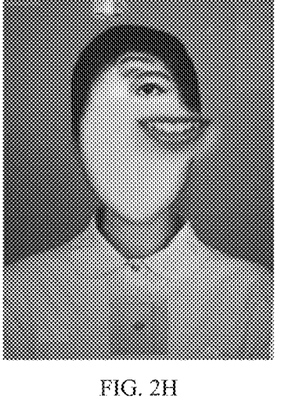
FIG. 2H is a schematic diagram of a target image according to an embodiment of the disclosure.
Figure 2I:
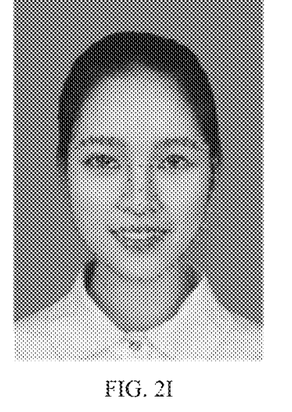
FIG. 2I is a schematic diagram of a first face template according to an embodiment of the disclosure.

As shown in FIG. 2B, 210 represents the facial grid which cover the user's facial image region. As shown in FIG. 2C, 221 represents the facial feature grid of the left eye. As shown in FIG. 2D, 222 represents the facial feature grid of the right eye. As shown in FIG. 2E, 223 represents the facial feature grid of the nose. As shown in FIG. 2F, 224 represents the facial feature grid of the mouth. The facial feature grids or facial grid are composed of multiple key points.

Figure 3:
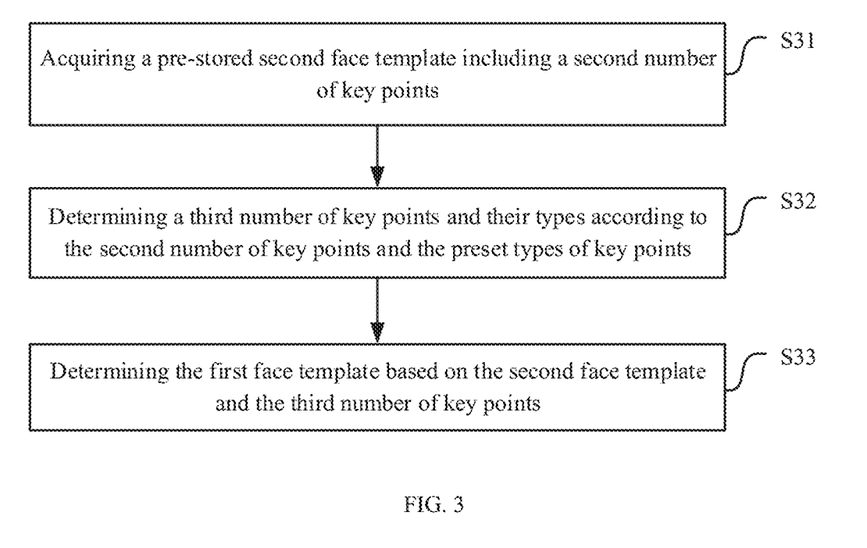
FIG. 3 is a flow chart of a method for processing an image according to an embodiment of the disclosure.

In some embodiments, as shown in FIG. 3, before processing the image to be processed, the terminal may determine the first face template based on a pre-stored second face template. The processing procedure is as follows.

The step S31 is of acquiring a pre-stored second face template including a second number of key points.

Figure 2J:
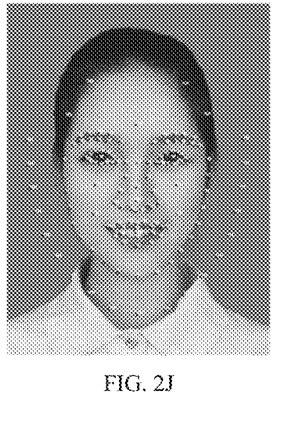
FIG. 2J is a schematic diagram of a second face template according to an embodiment of the disclosure.

In some embodiments, the terminal may acquire the pre-stored second face template including the second number of key points. As shown in FIG. 2J, which is a schematic diagram of a second face template provided by an embodiment of the present application, the second number of key points are distributed on the facial contour and the facial feature contour in the user's facial image, where each key point belongs to one of multiple preset types of key points. In some embodiments, the second number may be 101. Correspondingly, when the terminal numbers every key point, the numeral numbers of the second number of key points are 1 to 101.

The step S32 is of determining a third number of key points and their types according to the second number of key points and the preset types of key points.

In some embodiments, the terminal can determine the coordinate information of the second number of key points in a preset coordinate system. Then the terminal can calculate the coordinate information of the three number of key points according to a preset geometric mathematical calculation formula and the coordinate information of the second number of key points, to obtain the third number of key points. Then the terminal can determine the types of the third number of key points according to the coordinate information of the third number of key points.

An embodiment of the present application provides an example of the geometric mathematical calculation formula:

$$XC=XB+(XB-XA)*\lambda$$

A and B are two key points of the second number of key points included in the second face template, and C is a key point determined by the terminal based on the coordinate information of the key points A and B, $\lambda$ is a preset weight, and XA, XB and XC are the coordinates of the key points A, B and C in the preset coordinate system of the screen of the electronic device respectively.

In some embodiments, the terminal can determine a straight line passing through two adjacent key points in the preset coordinate system according to the coordinate information of the two key points, calculate the coordinate information of a certain point on the straight line based on the preset geometric mathematical calculation formula and the coordinate information of the two key points, and take the certain point as a new key point. Then, the terminal can determine a key point closest to the new key point in the preset coordinate system according to the coordinate information of the new key point, and take the type of the determined key point as the type of the new key point. The terminal can determine multiple new key points based on the second number of key points through the above processing procedure, to obtain the third number of key points and their types.

In some embodiments, the terminal can determine the type of a certain key point according to a received type instruction sent by a technician.

In some embodiments of the present application, the sum of the third number of key points and the second number of key points is the first number of key points, and the difference between the first face template and the second face template is only the different numbers of contained key points.

The step S33 is of determining the first face template based on the second face template and the third number of key points.

In some embodiments, the terminal may take the second face template further containing the third number of key points as the first face template.

In some embodiments of the present application, the terminal determines the third number of key points on the facial image and the peripheral area within the preset range of the facial image based on the second number of key points contained in the second face template, and creates the facial grid and facial feature grids based on the original second number of key points and the third number of key points, so that the created facial grid and facial feature grids are uniform and fine as possible, which can further improve the fitness of the facial feature images to the real five facial features of the user when the terminal maps the facial feature images corresponding to the facial feature grids to the facial image, to make the changes in five facial features more natural.

In some embodiments, if the terminal receives an instruction for changing facial feature(s) when receiving the instruction for the fly-away special effect or within a preset processing period after receiving the instruction for the fly-away special effect, the terminal may perform the following steps.

Step 1 is of creating the facial grid and facial feature grids in the image to be processed when receiving the instruction for changing facial feature(s).

In some embodiments, when taking a photo or recording a video through a terminal, a user can select a preset facial feature change icon from multiple special effect icons displayed on the preset display interface of the terminal. Then the terminal receives the preset instruction for changing facial feature(s). When the preset instruction for changing facial feature(s) is received, the processing procedure of the terminal is the same as the Step 11.

Step 2 is of determining the facial image in the image region covered by the facial grid.

In some embodiments, the processing procedure of the terminal is the same as the Step S12.

Step 3 is of setting the pixel value of each pixel in the facial image to the target pixel value.

In some embodiments, the processing procedure of the terminal is the same as the Step S13.

Step 4 is of extracting facial feature images from the image region covered by the facial feature grids.

In some embodiments, the processing procedure of the terminal is the same as the Step S14.

Step 5 is of obtaining deformed facial feature images by changing the shape(s) of the facial feature image(s) in response to a change identifier carried by the instruction for changing the facial feature(s).

In some embodiments, the instruction for changing the facial feature(s) may carry a change identifier, which identifies that the user's five facial feature(s) is/are made larger or smaller.

The terminal can determine the facial feature image(s) to be changed in shape based on the change identifier carried in the received instruction and place the facial feature image(s) at the position(s) corresponding to the corresponding facial feature grid(s), and then change the shape of the facial feature grid(s) through the preset image processing algorithm, thereby changing the shape(s) of the facial feature image(s) corresponding to the facial feature grid(s) to obtain the deformed facial feature image(s).

For example, when the change identifier carried by the instruction for changing facial feature(s) received by the terminal is an identifier identifying the user's eyes are made larger, the terminal can determine that the facial feature images to be changed in shape are the left-eye image and right-eye image of the user according to this identifier. Then, the terminal can enlarge the facial feature grid of the left eye and the facial feature grid of the right eye according to a preset proportion based on the preset image processing algorithm, thereby changing the shapes of the left-eye image and right-eye image to obtain the enlarged left-eye image and right-eye image.

Step 6 is of obtaining a target image by mapping the deformed facial feature images onto the facial image based on a preset triangular mapping algorithm.

In some embodiments, the terminal may maps the deformed facial feature image(s) onto the facial image based on the preset triangular mapping algorithm to obtain the target image.

In some embodiments of the present application, after receiving the instruction for changing facial feature(s), the terminal can change the shape(s) of the facial feature image(s) based on the facial feature grid(s), thereby changing the size of the five facial feature(s) of the user, increasing the variety of special effects, and further improving the user experience.

The technical solution provided by the embodiments of the present application may include the following beneficial effects: the facial grid and facial feature grids are created in the image to be processed when receiving the instruction for the fly-away special effect. On the one hand, the facial image may be determined in the image region covered by the facial grid, and the pixel value of each pixel in the facial image is set to the target pixel value. On the other hand, the image region covered by the facial feature grids may be extracted from the image to be processed, to obtain the facial feature images. Then the facial feature images may be mapped onto the facial image based on the preset triangular mapping algorithm and the preset offset(s), to obtain the processed target image. In this solution, the facial feature images and facial image are determined from the image to be processed, and the positions of the facial feature images relative to the facial image are changed according to the preset offset(s), so that the user's five facial features have the fly-away effect, improving the user experience.

Figure 4:
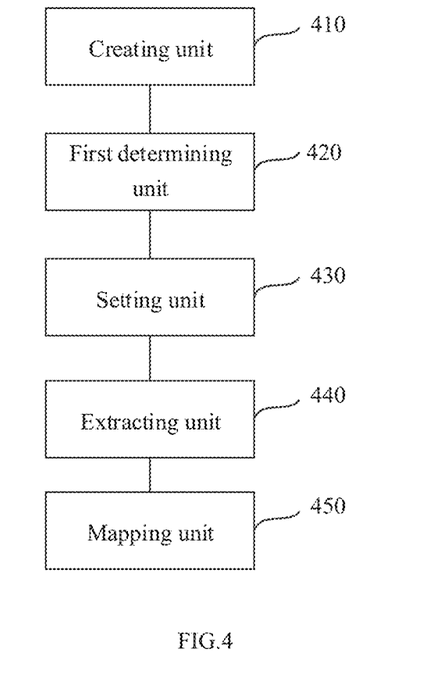
FIG. 4 is a block diagram of an apparatus for processing an image according to an embodiment of the disclosure.

FIG. 4 is a block diagram of an apparatus for processing an image according to an embodiment. Referring to FIG. 4, this apparatus includes a creating unit 410, a first determining unit 420, a setting unit 430, an extracting unit 440, and a mapping unit 450.

The creating unit 410 is configured to create a facial grid and facial feature grids in the image to be processed when receiving a preset instruction for the fly-away special effect.

The first determining unit 420 is configured to determine a facial image in an image region covered by the facial grid.

The setting unit 430 is configured to set a pixel value of each pixel in the facial image to a target pixel value.

The extracting unit 440 is configured to extract facial feature images from an image region covered by the facial feature grids.

The mapping unit 450 is configured to obtain a target image by mapping the facial feature images onto the facial image based on a preset triangular mapping algorithm and a preset offset.

In some embodiments, the creating unit includes:

a mapping sub-unit configured to map a first number of key points in a pre-stored first face template onto a facial image region of a user in the image to be processed, based on a preset mapping algorithm; and a creating sub-unit configured to create the facial grid and the facial feature grids based on the first number of key points and preset types of key points.

The preset types of key points comprise facial type, mouth type, nose type, and eye type.

In some embodiments, the apparatus further includes:

an acquisition unit configured to acquire a pre-stored second face template including a second number of key points;

a second determining unit configured to determine a third number of key points and their types according to the second number of key points and the preset types of key points; and a third determining unit configured to determine the first face template based on the second face template and the third number of key points.

In some embodiments, the setting unit includes:

an extracting sub-unit configured to extract the pixel values of pixels at a plurality of preset positions in the facial image, wherein the preset positions include positions at the forehead and/or cheek of the user; and a calculation sub-unit configured to calculate an average value of the plurality of pixel values, and determine the average value as the target pixel value.

In some embodiments, the apparatus is further configured to:

create the facial grid and the facial feature grids in the image to be processed when receiving an instruction for changing a facial feature:

determine the facial image in the image region covered by the facial grid;

set the pixel value of each pixel in the facial image to the target pixel value:

extract facial feature images from the image region covered by the facial feature grids:

obtain deformed facial feature images by changing a shape of at least one of the facial feature images in response to a change identifier carried by the instruction for changing the facial feature; and obtain a target image by mapping the deformed facial feature images onto the facial image based on the preset triangular mapping algorithm.

Regarding the apparatus in the above embodiments, the specific manner in which each unit performs the operations has been described in detail in the embodiments related to the method, and will not be illustrated in detail here.

Figure 5:
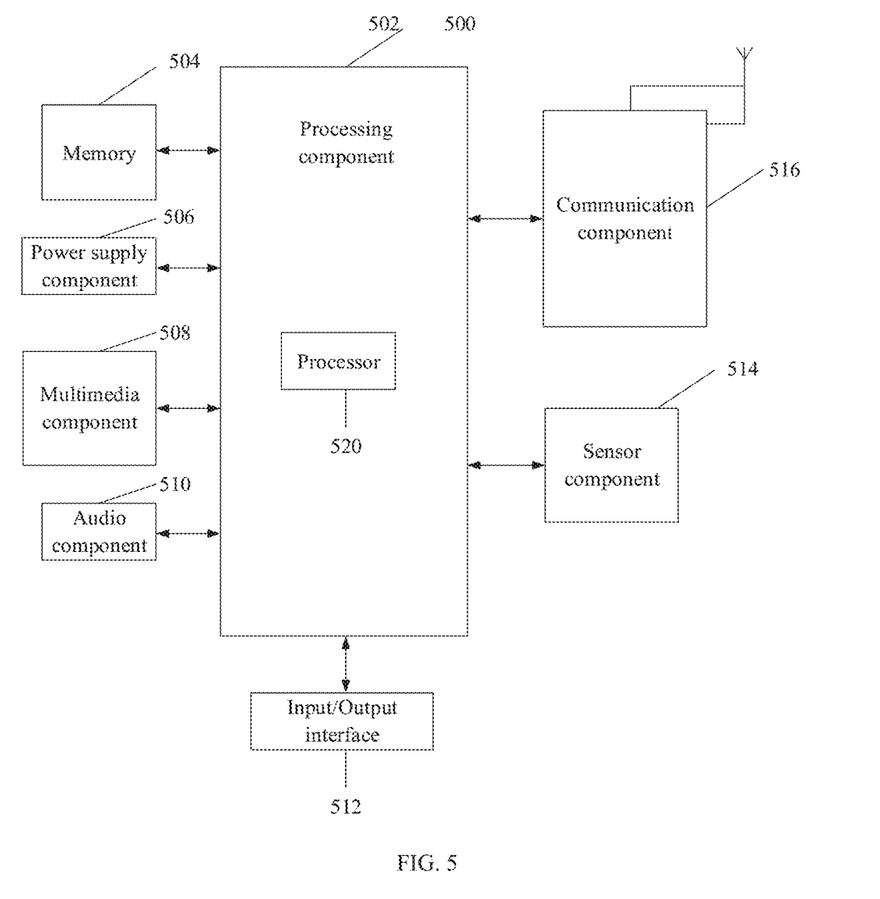
FIG. 5 is a block diagram of an electronic device according to an embodiment of the disclosure.

FIG. 5 is a block diagram of an electronic device 500 for processing an image according to an embodiment. For example, the electronic device 500 may be a mobile phone, computer, digital broadcasting terminal, message transceiver, game console, tablet device, medical device, fitness device, personal digital assistant, or the like.

Referring to FIG. 5, the electronic device 500 may include one or more of a processing component 502, a memory 504, a power supply component 506, a multimedia component 508, an audio component 510, an Input/Output (I/O) interface 512, a sensor component 514, and a communication component 516.

The processing component 502 generally controls the overall operations of the electronic device 500, such as operations associated with display, phone call, data communication, camera operation, and recording operation. The processing component 502 may include one or more processors 520 to execute instructions to complete all or a part of the steps of the above method. In addition, the processing component 502 may include one or more modules to facilitate the interactions between the processing component 502 and other components. For example, the processing component 502 may include a multimedia module to facilitate the interactions between the multimedia component 508 and the processing component 502.

The memory 504 is configured to store various types of data to support the operations of the electronic device 500. Examples of the data include instructions of any application program or method operated on the electronic device 500, contact person data, phone book data, messages, pictures, videos, and the like. The memory 504 may be implemented by any type of volatile or nonvolatile storage device or a combination thereof, such as Static Random Access Memory (SRAM), Electrically Erasable Programmable Read Only Memory (EEPROM). Erasable Programmable Read Only Memory (EPROM), Programmable Read Only Memory (PROM), Read Only Memory (ROM), magnetic memory, flash memory, magnetic disk or optical disk.

The power supply component 506 provides power for various components of the electronic device 500. The power supply component 506 may include a power management system, one or more power supplies, and other components associated with generating, managing and distributing the power for the electronic device 500.

The multimedia component 508 includes a screen of an output interface provided between the electronic device 500 and the user. In some embodiments, the screen may include a Liquid Crystal Display (LCD) and a Touch Panel (TP). If the screen includes a touch panel, the screen may be implemented as a touch screen to receive input signals from the user. The touch panel includes one or more touch sensors to sense the touching, the sliding, and the gestures on the touch panel. The touch sensor may not only sense the boundary of the touching or sliding operation, but also detect the duration and pressure related to the touching or sliding operation. In some embodiments, the multimedia component 508 includes a front camera and/or a rear camera. When the electronic device 500 is in the operation mode such as shooting mode or video mode, the front camera and/or the rear camera may receive the external multimedia data. Each of the front camera and rear camera may be a fixed optical lens system or have the focal length and the optical zoom capability.

The audio component 510 is configured to output and/or input audio signals. For example, the audio component 510 includes a microphone (MIC). When the electronic device 500 is in the operation mode such as call mode, recording mode and voice recognition mode, the microphone is configured to receive the external audio signals. The received audio signals may be further stored in the memory 504 or transmitted via the communication component 516. In some embodiments, the audio component 510 further includes a speaker for outputting the audio signals.

The I/O interface 512 provides an interface between the processing component 502 and a peripheral interface module, where the above peripheral interface module may be a keyboard, a click wheel, buttons or the like. These buttons may include but not limited to: home button, volume button, start button, and lock button.

The sensor component 514 includes one or more sensors for providing the electronic device 500 with the state assessments in various aspects. For example, the sensor component 514 may detect the opening/closing state of the electronic device 500, and the relative positioning of the components (for example, the display and keypad of the electronic device 500). The sensor component 514 may further detect the position change of the electronic device 500 or a component of the electronic device 500, the presence or absence of contact of the user with the electronic device 500, the orientation or acceleration/deceleration of the electronic device 500, and the temperature change of the electronic device 500. The sensor component 514 may include a proximity sensor configured to detect the presence of nearby objects with no physical contact. The sensor component 514 may further include a light sensor, such as CMOS or CCD image sensor, for use in the imaging applications. In some embodiments, the sensor component 514 may further include an acceleration sensor, a gyro sensor, a magnetic sensor, a pressure sensor, or a temperature sensor.

The communication component 516 is configured to facilitate the wired or wireless communications between the electronic device 500 and other devices. The electronic device 500 may access a wireless network based on a communication standard, such as WiFi, operator network (e.g., 2G, 3G, 4G or 5G), or a combination thereof. In some embodiments, the communication component 516 receives the broadcast signal or broadcast related information from an external broadcast management system via a broadcast channel. In some embodiments the communication component 516 further includes a Near Field Communication (NFC) module to facilitate the short-range communications. For example, the NFC module may be implemented based on the Radio Frequency IDentification (RFID) technology, Infrared Data Association (IrDA) technology, Ultra-WideBand (UWB) technology, Bluetooth (BT) technology and other technologies.

In some embodiments, the electronic device 500 may be implemented by one or more Application Specific Integrated Circuits (ASICs), Digital Signal Processors (DSPs), Digital Signal Processing Devices (DSPDs). Programmable Logic Devices (PLDs), Field Programmable Gate Arrays (FPGAs), controllers, microcontrollers, microprocessors or other electronic elements to perform the above method.

In some embodiments, a non-transitory computer readable storage medium including instructions, for example, the memory 504 including instructions, is further provided, where the above instructions can be executed by the processor 520 of the electronic device 500 to complete the above method. For example, the non-transitory computer readable storage medium may be ROM, Random Access Memory (RAM), CD-ROM, magnetic tape, floppy disk, optical data storage device, or the like.

Figure 6:
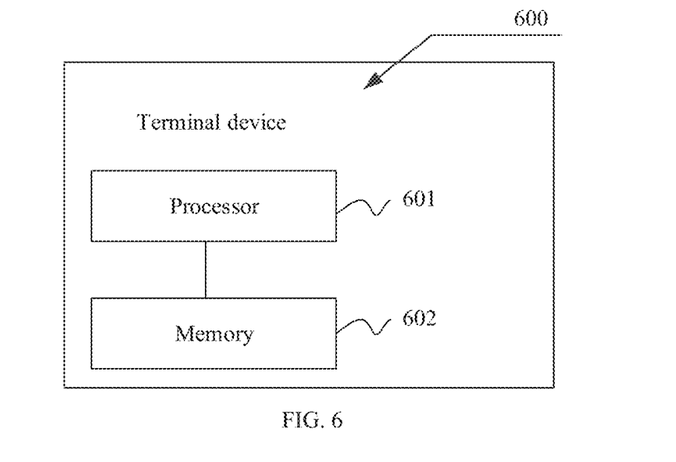
FIG. 6 is a block diagram of another electronic device according to an embodiment of the disclosure.

FIG. 6 is a structural block diagram of another electronic device according to an embodiment. The electronic device 600 may have a relatively large difference due to different configurations or performances, and may include one or more processors (Central Processing Units (CPUs)) 601 and one or more memories 602. The memory 602 stores at least one instruction that is loaded and executed by the processor 601 to implement the process of:

creating a facial grid and facial feature grids in an image to be processed when receiving a preset instruction for a fly-away special effect; determining a facial image in an image region covered by the facial grid; setting the pixel value of each pixel in the facial image to a target pixel value; extracting facial feature images from an image region covered by the facial feature grids in the image to be processed; and obtaining a target image by mapping the facial feature images onto the facial image based on a preset triangular mapping algorithm and a preset offset.

In some embodiments, the processor 601 is configured to: map a first number of key points in a pre-stored first face template onto a facial image region of a user in the image to be processed based on a preset mapping algorithm and create the facial grid and facial feature grids based on the first number of key points and preset types of key points. The preset types of key points include facial type, mouth type, nose type, and eye type.

In some embodiments, the processor 601 is configured to:
acquire a pre-stored second face template including a second number of key points; determine a third number of key points and their types according to the second number of key points and preset types of key points; and determine the first face template based on the second face template and the third number of key points.

In some embodiments, the processor 601 is configured to:
extract pixel values of pixels at a plurality of preset positions in the facial image, wherein the preset positions include positions at forehead and/or cheek of the user; and calculate an average value of the plurality of pixel values, and determine the average value as the target pixel value.

In some embodiments, the processor 601 is configured to:
create facial grid and facial feature grids in an image to be processed when receiving an instruction for changing a facial feature; determine a facial image in an image region covered by the facial grid; set the pixel value of each pixel in the facial image to a target pixel value; extract facial feature images from an image region covered by the facial feature grids in the image to be processed; obtain deformed facial feature images by changing a shape of at least one of the facial feature images in response to a change identifier carried by the instruction for changing the facial feature; and obtain a target image by mapping the deformed facial feature images onto the facial image based on the preset triangular mapping algorithm.

Some other embodiments of the present application further provide a computer readable storage medium carrying one or more computer instruction programs thereon. When the computer instruction programs are executed by one or more processors, the one or more processors implement the steps of any method for processing an image described above.

Some other embodiments of the present application further provide a computer program product containing instructions, which causes a computer to perform any method for processing an image in the foregoing embodiments when running on the computer.

The above embodiments may be implemented in whole or in part by software hardware, firmware or any combination thereof. When implemented by software, they may be implemented in the form of a computer program product in whole or in part. The computer program product includes one or more computer instructions. When the computer program instructions are loaded and executed on a computer, the processes or functions described in the embodiments of the present application are generated in whole or in part. The computer may be a general-purpose computer, a special-purpose computer, a computer network, or other programmable devices. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, wireless, microwave, etc.) way. The computer readable storage medium may be any available medium that can be accessed by a computer, or a data storage device such as server or data center that is integrated with one or more available media. The available medium may be a magnetic medium (for example, floppy disk, hard disk, magnetic tape), an optical medium (for example, DVD), or a semiconductor medium (for example, Solid State Disk (SSD)), etc.

It should be understood that the present application is not limited to the precise structures which have been described above and shown in the figures, and can be modified and changed without departing from the scope of the present application. The scope of the present application is only limited by the attached claims.

What is claimed is:

1. A method for processing an image, comprising:
receiving an instruction for a preset fly-away special effect;
creating a facial grid and facial feature grids in the image to be processed;
determining a facial image in an image region covered by the facial grid;
setting a pixel value of each pixel in the facial image to a target pixel value;
extracting facial feature images from an image region covered by the facial feature grids; and
obtaining a target image by mapping the facial feature images onto the facial image based on a preset triangular mapping algorithm and a preset offset.

2. The method according to claim 1, wherein said creating the facial grid and the facial feature grids comprises:
mapping a first number of key points in a pre-stored first face template onto a facial image region of a user in the image to be processed, based on a preset mapping algorithm; and
creating the facial grid and the facial feature grids based on the first number of key points and preset types of key points;
wherein the preset types of key points comprise facial type, mouth type, nose type, and eye type.

3. The method according to claim 2, further comprising:
acquiring a pre-stored second face template comprising a second number of key points;
determining a third number of key points and their types according to the second number of key points and preset types of key points; and determining the first face template based on the second face template and the third number of key points.

4. The method according to claim 1, further comprising:
extracting pixel values of pixels at a plurality of preset positions in the facial image, wherein the preset positions comprise positions at forehead and/or cheek; and
determining the target pixel value to be an average value of the pixel values.

5. The method according to claim 2, further comprising:
extracting pixel values of pixels at a plurality of preset positions in the facial image, wherein the preset positions comprise positions at forehead and/or cheek; and
determining the target pixel value to be an average value of the pixel values.

6. The method according to claim 3, further comprising:
extracting pixel values of pixels at a plurality of preset positions in the facial image, wherein the preset positions comprise positions at forehead and/or cheek; and
determining the target pixel value to be an average value of the pixel values.

7. The method according to claim 1, further comprising:
receiving an instruction for changing a facial feature;
creating the facial grid and facial feature grids in the image to be processed;
determining the facial image in the image region covered by the facial grid;
setting the pixel value of each pixel in the facial image to the target pixel value;
extracting facial feature images from the image region covered by the facial feature grids;
obtaining deformed facial feature images by changing a shape of at least one of the facial feature images in response to a change identifier carried by the instruction for changing the facial feature; and
obtaining a target image by mapping the deformed facial feature images onto the facial image based on a preset triangular mapping algorithm.

8. An electronic device, comprising:
a memory storing a computer program as well as candidate intermediate data and result data generated when the computer program is executed;
a processor configured to:
create a facial grid and facial feature grids in an image to be processed when receiving an instruction for a preset fly-away special effect;
determine a facial image in an image region covered by the facial grid;
set a pixel value of each pixel in the facial image to a target pixel value;
extract facial feature images from an image region covered by the facial feature grids; and
obtain a target image by mapping the facial feature images onto the facial image based on a preset triangular mapping algorithm and a preset offset.

9. The electronic device according to claim 8, wherein the processor is further configured to:
map a first number of key points in a pre-stored first face template onto a facial image region of a user in the image to be processed, based on a preset mapping algorithm; and
create the facial grid and facial feature grids based on the first number of key points and preset types of key points;
wherein the preset types of key points comprise facial type, mouth type, nose type, and eye type.

10. The electronic device according to claim 9, wherein the processor is further configured to:

acquire a pre-stored second face template comprising a second number of key points;
determine a third number of key points and their types according to the second number of key points and preset types of key points; and
determine the first face template based on the second face template and the third number of key points.

11. The electronic device according to claim 8, wherein the processor is further configured to:
extract pixel values of pixels at a plurality of preset positions in the facial image, wherein the preset positions comprise positions at forehead and/or cheek; and
determine the target pixel value to be an average value of the pixel values.

12. The electronic device according to claim 9, wherein the processor is further configured to:
extract pixel values of pixels at a plurality of preset positions in the facial image, wherein the preset positions comprise positions at forehead and/or cheek; and
determine the target pixel value to be an average value of the pixel values.

13. The electronic device according to claim 10, wherein the processor is further configured to:
extract pixel values of pixels at a plurality of preset positions in the facial image, wherein the preset positions comprise positions at forehead and/or cheek; and
determine the target pixel value to be an average value of the pixel values.

14. The electronic device according to claim 8, wherein the processor is further configured to:
receive an instruction for changing a facial feature;
create the facial grid and facial feature grids in the image to be processed;
determine the facial image in the image region covered by the facial grid;
set the pixel value of each pixel in the facial image to the target pixel value;
extract facial feature images from the image region covered by the facial feature grids;
obtain deformed facial feature images by changing a shape of at least one of the facial feature images in response to a change identifier carried by the instruction for changing the facial feature; and
obtain a target image by mapping the deformed facial feature images onto the facial image based on a preset triangular mapping algorithm.

15. A nonvolatile computer readable storage medium carrying one or more computer instruction programs thereon, wherein when the computer instruction programs are executed by one or more processors, the one or more processors are configured to:
create a facial grid and facial feature grids in an image to be processed when receiving an instruction for a preset fly-away special effect;
determine a facial image in an image region covered by the facial grid;
set a pixel value of each pixel in the facial image to a target pixel value;
extract facial feature images from an image region covered by the facial feature grids; and
obtain a target image by mapping the facial feature images onto the facial image based on a preset triangular mapping algorithm and a preset offset.

16. The nonvolatile computer readable storage medium according to claim 15, wherein the one or more processors are further configured to:

map a first number of key points in a pre-stored first face template onto a facial image region of a user in the image to be processed, based on a preset mapping algorithm; and create the facial grid and facial feature grids based on the first number of key points and preset types of key points;

wherein the preset types of key points comprise facial type, mouth type, nose type, and eye type.

17. The nonvolatile computer readable storage medium according to claim 16, wherein the one or more processors are further configured to:

acquire a pre-stored second face template comprising a second number of key points;

determine a third number of key points and their types according to the second number of key points and preset types of key points; and determine the first face template based on the second face template and the third number of key points.

18. The electronic device according to claim 15, wherein the one or more processors are further configured to:

extract pixel values of pixels at a plurality of preset positions in the facial image, wherein the preset positions comprise positions at forehead and/or cheek; and determine the target pixel value to be an average value of the pixel values.

19. The nonvolatile computer readable storage medium according to claim 16, wherein the one or more processors are further configured to:

extract pixel values of pixels at a plurality of preset positions in the facial image, wherein the preset positions comprise positions at forehead and/or cheek; and determine the target pixel value to be an average value of the pixel values.

20. The nonvolatile computer readable storage medium according to claim 15, wherein the one or more processors are further configured to:

receive an instruction for changing a facial feature;

create the facial grid and facial feature grids in the image to be processed;

determine the facial image in the image region covered by the facial grid;

set the pixel value of each pixel in the facial image to the target pixel value;

extract facial feature images from the image region covered by the facial feature grids;

obtain deformed facial feature images by changing a shape of at least one of the facial feature images in response to a change identifier carried by the instruction for changing the facial feature; and obtain a target image by mapping the deformed facial feature images onto the facial image based on a preset triangular mapping algorithm.

* * * * *